US009919715B2

(12) United States Patent
Tseng et al.

(10) Patent No.: US 9,919,715 B2
(45) Date of Patent: Mar. 20, 2018

(54) VEHICLE MODE SCHEDULING WITH LEARNED USER PREFERENCES

(71) Applicant: Ford Global Technologies, LLC, Dearborn, MI (US)

(72) Inventors: Fling Finn Tseng, Ann Arbor, MI (US); Kwaku O. Prakah-Asante, Commerce Township, MI (US); Jianbo Lu, Northvile, MI (US); Steven Joseph Szwabowski, Northville, MI (US); Perry Robinson MacNeille, Lathrup Village, MI (US); Xiaoming Wang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/143,558

(22) Filed: Apr. 30, 2016

(65) Prior Publication Data

US 2017/0313323 A1    Nov. 2, 2017

(51) Int. Cl.
*B60W 50/08*    (2012.01)
*B60W 10/00*    (2006.01)
*B60K 35/00*    (2006.01)

(52) U.S. Cl.
CPC .......... *B60W 50/082* (2013.01); *B60K 35/00* (2013.01); *B60W 10/00* (2013.01)

(58) Field of Classification Search
CPC ..... B60W 50/082; B60K 35/00; G01C 21/34; G08G 1/00; G08G 1/0968; G08G 1/137
USPC .......................................................... 701/36
See application file for complete search history.

(56) References Cited

U.S. PATENT DOCUMENTS

| 6,112,151 | A | * | 8/2000 | Kruse ................. F02D 41/2422 180/167 |
| 7,805,240 | B2 | | 9/2010 | Naitou et al. |
| 8,116,973 | B2 | | 2/2012 | Soma et al. |
| 8,392,116 | B2 | * | 3/2013 | Lehmann .......... G01C 21/3438 340/991 |
| 8,788,113 | B2 | | 7/2014 | Filev et al. |
| 8,862,346 | B2 | * | 10/2014 | Saltsman ................ G06F 17/00 701/51 |
| 8,965,621 | B1 | | 2/2015 | Urmson et al. |

(Continued)

FOREIGN PATENT DOCUMENTS

| GB | 2489109 A | 9/2012 |
| WO | WO 2015/124983 A1 | 8/2015 |
| WO | WO 2015/162475 | 10/2015 |

OTHER PUBLICATIONS

Search Report dated Oct. 31, 2017, for GB Patent Application No. GB1706832.1 (5 Pages).

*Primary Examiner* — McDieunel Marc
(74) *Attorney, Agent, or Firm* — James P. Muraff; Neal, Gerber & Eisenberg LLP

(57) ABSTRACT

Systems and methods for vehicle mode scheduling with learned user preferences include monitoring vehicle data when a vehicle changes from a first mode to a second mode. The method also includes analyzing the vehicle data to identify a preference for the second mode during a driving context. Additionally, the method includes generating a recommendation on whether to switch to the second mode while traversing a route based on the vehicle data, and the driving context, and presenting the recommendation to the driver.

16 Claims, 6 Drawing Sheets

(56) References Cited

U.S. PATENT DOCUMENTS

| | | | |
|---|---|---|---|
| 9,043,260 B2 * | 5/2015 | Athas | G06N 5/02 |
| | | | 706/46 |
| 9,081,653 B2 * | 7/2015 | Ricci | G06F 17/00 |
| 9,087,349 B2 * | 7/2015 | Oshima | H04N 5/2356 |
| 9,097,549 B1 | 8/2015 | Rao et al. | |
| 9,153,847 B2 * | 10/2015 | Harty | H01M 10/465 |
| 9,277,349 B2 * | 3/2016 | Mankowski | H04W 4/006 |
| 9,467,515 B1 * | 10/2016 | Penilla | G06F 3/04842 |
| 9,493,130 B2 * | 11/2016 | Penilla | H04L 67/12 |
| 9,523,584 B2 * | 12/2016 | Jin | G01C 21/3469 |
| 9,536,197 B1 * | 1/2017 | Penilla | G06N 5/025 |
| 9,596,570 B1 * | 3/2017 | Cardoso de Moura | H04W 4/023 |
| 9,648,107 B1 * | 5/2017 | Penilla | H04L 67/12 |
| 9,672,823 B2 * | 6/2017 | Penilla | G10L 15/22 |
| 2013/0274952 A1 | 10/2013 | Weslati et al. | |
| 2014/0046518 A1 | 2/2014 | Roos et al. | |
| 2015/0166076 A1 | 6/2015 | Kim et al. | |

* cited by examiner

VEHICLE MODE SCHEDULING WITH LEARNED USER PREFERENCES

TECHNICAL FIELD

The present disclosure generally relates to vehicles with multiple modes of driving dynamics and, more specifically, vehicle mode scheduling with learned user preferences.

BACKGROUND

Vehicles with multiple modes of driving dynamics are becoming increasingly popular. These modes change settings in multiple vehicle subsystems, such as steering, powertrain, chassis, interior lighting, sound insulation and/or filtering infotainment systems, etc. The modes provide the user with flexibility by changing the behavior of the vehicle for different driving conditions and to better match the driver's preferences in terms of performance.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments for vehicle mode scheduling with learned user preferences are disclosed. The example disclosed method includes monitoring vehicle data when a vehicle changes from a first mode to a second mode. The example method also includes analyzing the vehicle data to identify a preference for the second mode during a driving context. Additionally, the example method includes generating a recommendation on whether to switch to the second mode while traversing a route based on the vehicle data, and the driving context, and presenting the recommendation to the driver.

An example system includes a server and a vehicle. The example disclosed server is configured to analyze vehicle data to identify a preference of a driver to switch from a first mode to a second mode during a driving context. The example vehicle is configured to monitor vehicle data when the vehicle changes from the first mode to the second mode. The example vehicle is also configured to generate a recommendation on whether to switch to the second mode while traversing a route based on a classifier received from the server, and present the recommendation to the driver.

An example vehicle includes sensors, memory, and a processor. The example sensors are configured to monitor vehicle data. The example memory is configured to store a plurality of classifiers received from a server. The classifiers predict a preference to transition from a first mode to a second mode based on a subset of the vehicle data. The example processor is communicatively coupled to the memory and the sensors. Additionally, the example processor is configured to select one of the plurality of classifiers based on a driving context and apply the vehicle data to the selected classifier to generate a recommendation on whether to switch to the second mode while traversing a route. The example vehicle is also configured to, in response to generating the recommendation to switch to the second mode, display the recommendation on an infotainment head unit.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
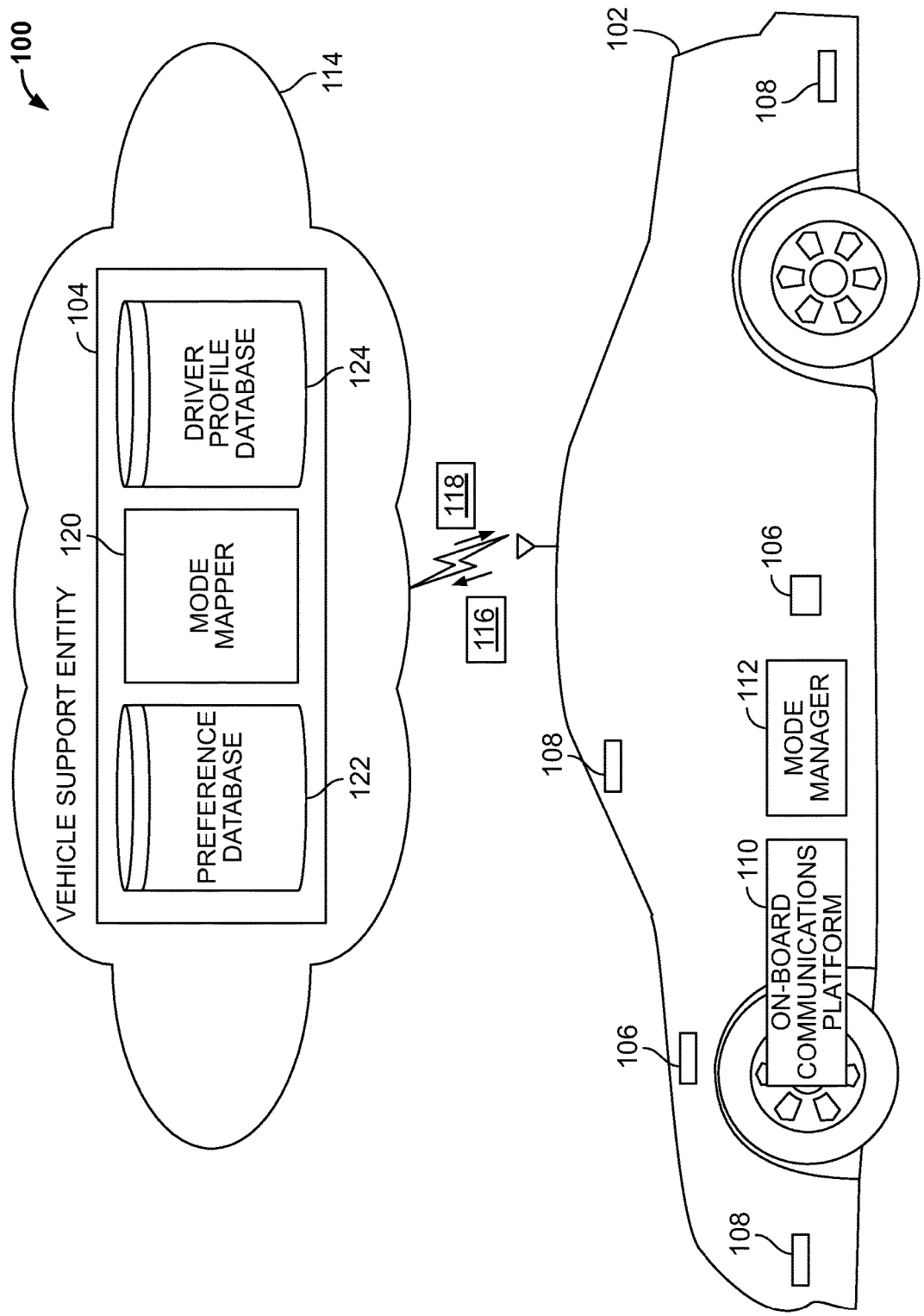
FIG. 1 is a system diagram to implement vehicle mode scheduling with learned user preferences in according to the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles (e.g., cars, trucks, vans, etc.) have multiple driving modes that offer different driving dynamics. For example, a vehicle may have a sport mode, a normal mode, a comfort mode, one or more terrain modes (e.g., modes for specific types of terrain, such as unpaved roads, etc.) and/or a fuel economy mode, etc. The modes change settings (e.g. of various electronic control units (ECUs)) in the vehicle to change the balance of different driving preferences. For example, the sport mode may change steering control, transmission control, throttle control, traction control and/or stability control, etc. to increase performance and control of the vehicle at the expense of the fuel efficiency of the vehicle. Over time, a driver may develop preferences for which mode to use in different situations and priorities, such as fuel economy versus driving enjoyment.

As disclosed in more detail below, the vehicle includes a mode data manager that captures data from vehicle subsystems (e.g., steering control, transmission control, throttle control, traction control, stability control, global positioning system (GPS) coordinates, etc.) when a driver changes the driving mode of the vehicle. A vehicle support entity receives the captured data from the mode data manager and generates a vehicle mode profile based on the captured data and data derived from the captured data. For example, the speed limit, the grade level, and level of traffic congestion may be obtained from data sources external to the vehicle. The vehicle support entity is any suitable entity (e.g., a vehicle manufacturer, a vehicle dealer, a customer parts dealer, a data management company, etc.) provides support services to a vehicle. A mode manager receives the vehicle mode profile from the vehicle support entity. The mode data manager monitors the vehicle subsystems. Based on the vehicle subsystems and the vehicle mode profile, the mode manager recommends a driving mode (e.g., via a center console display, a heads up display, a dashboard display, etc.) or automatically switches the vehicle into the recommended driving mode (e.g., when the vehicle is an autonomous or semi-autonomous vehicle).

FIG. 1 is an example system 100 to implement vehicle mode scheduling with learned user preferences in according to the teachings of this disclosure. In the illustrated example, the system 100 includes a vehicle 102 (e.g., a car, a truck, a van, etc.) and a vehicle support entity 104 (e.g., a vehicle manufacturer, a vehicle dealer, a customer parts dealer, a data management company, etc.). The vehicle 102 may be a standard gasoline powered vehicle, a hybrid vehicle, an electric vehicle, a fuel cell vehicle, or any other mobility implement type of vehicle. The vehicle 102 may be non-autonomous, semi-autonomous, or autonomous. The vehicle 102 includes parts related to mobility or propulsion, such as a powertrain with an engine, a transmission, a suspension, a driveshaft, and/or wheels, etc. The example vehicle 102 includes electronic control units (ECUs) 106, sensors 108, an on-board communications platform 110, and a mode manager 112.

The ECUs 106 monitor and control the systems (e.g., steering control, braking control, transmission control, engine control, etc.) of the vehicle 102. Some vehicles 102 may have seventy or more ECUs 106 located in various locations around the vehicle 102. The ECUs 106 are discrete sets of electronics that include their own circuit(s) (such as integrated circuits, microprocessors, memory, storage, etc.) and firmware, sensors, actuators, and/or mounting hardware. The driving modes are defined by the settings of the various ECUs 106. For example, an economy driving mode may set the transmission control to shift into a higher gear at a lower revolution per minute (RPM), and/or the throttle control to reduce the responsiveness of the throttle, etc.

The sensors 108 may be arranged in and around the vehicle 102 in any suitable fashion. The sensors 108 may include camera(s), sonar, RADAR, LiDAR, ultrasonic sensors, optical sensors, or infrared devices configured to measure properties around the exterior of the vehicle 102. Additionally, some sensors 108 may be mounted inside the passenger compartment of the vehicle 102 or in the body of the vehicle 102 (such as, the engine compartment, the wheel wells, etc.) to measure properties in the interior of the vehicle 102. For example, such sensors 108 may include accelerometers, odometers, pitch and yaw sensors, wheel speed sensors, cameras, microphones, and thermistors, tire pressure sensors, biometric sensors, etc. The sensors 108 provide a context for when a user changes the driving mode of the vehicle 102.

The on-board communications platform 110 includes wired or wireless network interfaces to enable communication with an external network 114. The on-board communications platform 110 also includes hardware (e.g., processors, memory, storage, etc.) and software to control the wired or wireless network interfaces. Further, the external network(s) 114 may be a public network, such as the Internet; a private network, such as an intranet; or combinations thereof, and may utilize a variety of networking protocols now available or later developed including, but not limited to, TCP/IP-based networking protocols. The on-board communications platform 110 may also include a wired or wireless interface to enable direct communication with an electronic device (such as, a smart phone, a tablet computer, a laptop, etc.).

The mode manager 112 monitors (a) the driving mode of the vehicle 102, and (b) the data from the ECUs 106 and the sensors 108. The mode manager 112 generates a mode event record 116 in response to detecting a change in the driving mode of the vehicle 102. For example, a driver may choose a mode by pressing a button on a center console and/or a touch screen on an infotainment head unit (e.g., the infotainment head unit 402 of FIG. 4 below) of the vehicle 102. When the driver of the vehicle 102 is identified, the mode event record 116 is associated with a profile of the driver. In such a manner, the mode profiles 118 are created with the preferences of particular driver(s). In some examples, the mode manager 112 distinguishes between (i) changes to the driving mode due to the drivers actuating a control and (ii) changes to the driving mode due to an automated system, such as a system in an autonomous or semi-autonomous vehicle, or even the mode manager 112. In such examples, the mode manager 112 generates the mode event record 116 in response to the driver changing the driving mode, but does not generate the mode event record 116 in response to an automated system changing the driving mode.

The mode manager 112 includes in the mode event record 116 data for a period of time (e.g., two minutes, five minutes, etc.) before the driving mode change and a period of time (e.g., thirty seconds, one minute, etc.) after a driving mode change. The mode event record 116 includes (a) navigation system derived data (e.g., geographic location, route, etc.), (b) vehicle mode data (e.g., current mode, past modes, vehicle autonomy level, etc.), (c) data captured by the ECUs 106 and the sensors 108 (e.g., transmission settings, wheel speeds, engine temperature, tire pressure, etc.), (d) road data (e.g., road conditions, speed limits, pavement type, road roughness level, elevation changes, road radius, number of speed limit changes per mile, etc.), (e) ambient condition data (e.g., weather, temperature, etc.), (f) driver characteristic data (e.g., driving style, driving intent, etc.), (g) time data (e.g., day, date, time of day, etc.), and/or (h) vehicle data (e.g., weight, class, model, powertrain settings, feature set, etc.). The data collected by the mode manager 112 is sometimes referred to herein as "vehicle dynamics data." Additionally, the mode event record 116 includes the driving mode before the driving mode change and the drive mode after the driving mode change. In some examples, the road data includes detailed map data, such as speed limits, road curves, elevation changes, etc. provided by an advanced driver assistance system (ADAS). Additionally, the road data includes information derived from the data from the ECUs 106 and the sensors 108. For example, the condition of the road (e.g., icy, wet, snow-covered, sand, gravel, etc.) may be derived from data from the wheel speed sensors and the stability control system.

From time to time (e.g., periodically, aperiodically, etc.), the mode manager 112 sends the mode event record 116 to the vehicle support entity 104 via the on-board communications platform 110. In some examples, the mode manager 112 may transfer multiple mode event records 116 periodically (e.g., daily, weekly, etc.). In some examples, the mode manager 112 waits until the vehicle 102 is connected to the external network 114 via a WLAN connection so not to use cellular data. In some examples, the mode manager 112 sends the mode event record 116 when the mode event record 116 is created.

The mode manager 112 receives a mode profile 118 from the vehicle support entity 104. In some examples, the mode profile 118 is associated with the vehicle 102. In such examples, the mode profile 118 represents an amalgam of the preferences of the driver of the vehicle 102. In some examples, the mode profile 118 is associated with a driver profile of the driver. In such examples, the mode profile 118 is downloaded from the vehicle support entity 104 when the driver is identified by a driver identification system. In some examples, the mode profile 118 may be associated with a passenger of the vehicle 102. In such a manner, the driver may use recommendations based on the mode profile 118 to drive in a manner pleasing to the passenger. The mode profile 118 associates the vehicle dynamics data with the possible driving modes of the vehicle 102. In some examples, the mode profile 118 is associated with a particular geographic area or a particular route. The mode manager 112 applies the vehicle dynamic data to the mode profile 118. The mode manager 112 applies vehicle dynamics data to the mode profile 118 to generate a recommendation to activate a driving mode. In some examples, the mode manager 112, based on the mode profile 118, also generates a strength value associated with the recommendation. In such a manner, a driver may choose to react to the recommendation based on the strength value. The mode manager 112, via the infotainment head unit, audibly and/or visually presents the recommendation to the driver. In some examples, when the vehicle 102 is autonomous or semi-autonomous, the mode manager 112 causes the vehicle 102 to enter the recommended driving mode.

As disclosed in more detail in connection with FIG. 2 below, the vehicle support entity 104 analyzes the mode event records 116 received from the vehicle 102 and generates a mode profile 118 for the vehicle 102. In the illustrated example, the vehicle support entity 104 includes a server executing on the external network 114. In some examples, the vehicle support entity 104 includes one or more Internet servers (sometime referred to as the "cloud"). In the illustrated example, the vehicle support entity 104 includes a mode mapper 120, a preference database 122, and a driver profile database 124.

The mode mapper 120 analyzes the mode event records 116 received from the vehicle 102 and generates the mode profile 118 for the vehicle 102. The mode profile 118 contains one or more classifiers that uses data monitored by the mode manager 112 to (a) predict driving modes based on frequent destinations and routes, (b) predict driving modes based on average driver preference, and/or (c) predict driving modes based on similar drivers. From time to time, the mode mapper 120 sends the mode profile 118 to the vehicle 102. For examples, the mode mapper 120 may send the mode profile 118 after the mode profile 118 has been generated or updated. As another example, the mode mapper 120 may send the mode profile 118 in response to detecting that a current mode profile 118 downloaded to the vehicle 102 does not include the route that the vehicle 102 is traveling on, but where one or more mode profiled 118 exist for similar drivers on the route.

Based on the vehicle dynamics data in the mode event records 116, the mode mapper 120 generates a pattern map that associates the vehicle dynamics data with the changes in the driving mode. The mode mapper 120 reduces the pattern map into candidate classifiers. The candidate classifier associated a subset of the vehicle dynamics data to generate a mode recommendation. For example, one of the candidate classifiers may generate a mode recommendation based on a road condition value (e.g. wet, icy, gravel, dirt, etc.) and a road curve value (e.g., straight, a 20 degree curve, etc.).

Candidate classifiers may be one dimensional (e.g., the value of one variable in the vehicle dynamics data is used to generate a recommendation) or multidimensional (e.g., two or more variables in the vehicle dynamics data are used to generate a recommendation). In some examples, the mode mapper 120 uses the full factorial, fractional factorial or other design of experiment methods to determine a set of candidates pattern maps with different combinations of inputs (e.g., different combinations of the vehicle dynamics data). One of the pattern map may consist of all input signals but all the rest of the candidate shall have only a subset of all inputs. Each candidate map will have a classifier built based subsets of its inputs. The classifier is trained and its performance is recorded. The mode mapper 120 performs classification tests on the candidate classifiers to select one of the candidate classifiers. The candidate classifiers are evaluated based on complexity e.g. number of inputs) and performance (e.g. a correct prediction rate). This process involves cross validation where available data is iteratively separated into training and validation data to obtain all performance measures. The mode mapper 120 selects one of the candidate classifiers to include in the mode profile 118 sent to the vehicle 102.

When the mode mapper 120 does not have enough mode event records 116 associated with a geographic region and/or a navigational route in which the vehicle 102 is traveling to generate a candidate classifier that passes the classification tests (e.g., the mode mapper 120 rejects the candidate classifiers), the mode mapper 120 compares a driver profile stored in the driver profile database 124 associated with the vehicle 102 with preference profiles stored in the preference database 122. The preference profiles associates mode classifiers with demographic data of drivers, the geographic locations, and/or navigational routes. Based on demographic data of associated with driver(s) of the vehicle 102, the geographical area of the vehicle 102, and/or the navigational route being traversed by the vehicle 102, the mode mapper 120 selects a classifier in the preference database 122 to include in the mode profile 118 sent to the vehicle 102. In such a scenario, When the mode mapper 120 does have enough mode event records 116 associated with a geographic region and/or a navigational route in which the vehicle 102 is traveling to generate a candidate classifier that passes the classification tests, the mode mapper 120 updates the mode profile 118 to include that candidate classifier.

Figure 2:
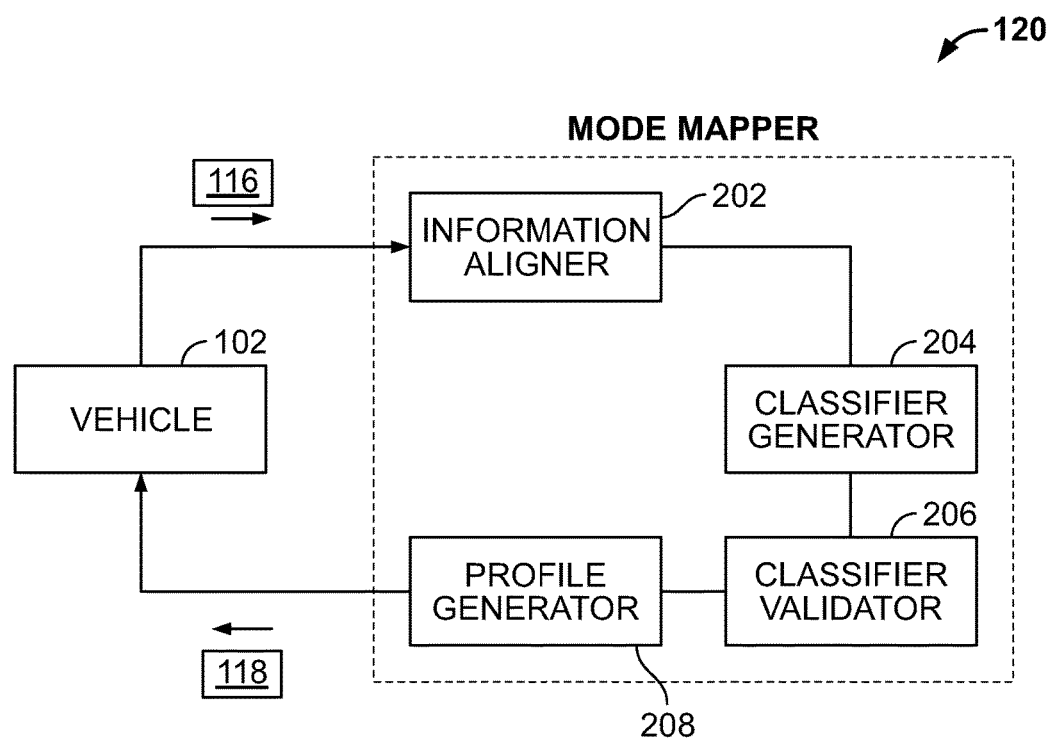
FIG. 2 is a block diagram of the mode mapper of FIG. 1.

FIG. 2 is a block diagram of the mode mapper 120 of FIG. 1. In the illustrated example, the mode mapper 120 includes an information aligner 202, a classifier generator 204, a classifier validator 206 and profile generator 208. In the illustrated example, the mode mapper 120 is communicatively coupled to the vehicle 102. The mode mapper 120 receives mode event records 116 from the vehicle 102 and sends mode profiles 118 to the vehicle 102.

The information aligner 202 receives the mode event records 116. The information aligner 202 creates a uniform set of data by aligning variables with different sampling frequencies. For examples, if a tire pressure sensor samples the tire pressure every fifteen seconds and the wheel speed sensors sample the speed of the wheels every second, the information aligner 202 may average or otherwise manipulate the wheel speed data to get a value for every fifteen second period. Additionally, the information aligner 202 may perform other data preprocessing functions, such as standardizing data formats and filtering out-of-range values, impossible data combinations and/or inferring missing values, etc. In some examples, the information aligned 202 separates vehicle dynamics data into different groups based on a driving context, such as a geographic area, a navigational route, a time of day, or a destination, etc.

The classifier generator 204 generates candidate classifiers that predict a driving mode based on a subset of the vehicle dynamics data. In some examples, the classifier generator 204 generates the candidate classifiers using a specific group of the vehicle dynamics data based on a driving context of interest. The classifier generator 204 applies design of experiment techniques (such as, full factorial design, fractional factorial design, etc.) and machine learning techniques (such as, support vector machines, fuzzy C-means, K nearest neighbor, linear discriminant analysis, mountain clustering) to identify reduced maps of different sets of the vehicle dynamics data. For example, if the vehicle dynamics data includes {speed, road condition, time of day}, using the design of experiment techniques, the reduced pattern maps to be evaluated maybe be {speed}, {road condition}, {time of day}, {speed, road condition}, {speed, time of day}, {road condition, time of day}, and {speed, road condition, time of day}. The machine learning techniques are used to select ones of the reduced pattern maps to be the candidate classifiers. For example, some of the reduced pattern maps may not cluster in a manner that the inputs (e.g., the particular vehicle dynamics data of the reduced pattern map) can be associated with one or more outputs (e.g., the driving modes). In such a manner, a full pattern map of the vehicle dynamics data can be reduced into the one or more candidate classifiers. The candidate classifiers include a combination of variables of the vehicle dynamics data that are predictive of which driving mode the driver prefers. For example, one of the candidate classifiers may determine whether the driver prefers to be in the normal driving mode or the comfort driving modes based on the a speed variable and the road condition variable when driving in a particular geographic area (e.g. a driving context of interest).

The classifier validator 206 applies tests to the candidate classifiers generated by the classifier generator 204. The tests balance the number of variables used by a candidate classifier with prediction accuracy. A lower number of variables used by a candidate classifier means that the vehicle 102 can process the classifier with less processing power. However, greater prediction accuracy means that the recommendation of the mode manager 112 will match the actual preferences of the driver more closely, increasing driver satisfaction. The classifier validator 206 compares the number of variables used by candidate classifiers to a threshold number of variables. The classifier validator 206 eliminates candidate classifiers that don't satisfy (e.g. are greater than) the threshold number of variables. In some examples, the threshold number of variables is five. Additionally, the classifier validator 206 applies vehicle dynamics data in the mode event records 116 received by the information aligner 202 to the candidate classifier. The classifier validator 206 compares the driving mode predicted by the candidate classifier to the actual driving mode in the mode event records 116. The classifier validator 206 eliminates candidate classifiers that do not satisfy (e.g., are less than) a threshold accuracy. (e.g., 70%, 80%, etc.). In some examples, when all of the candidate classifiers are eliminated, the classifier validator 206 requests more candidate classifiers from the classifier generator 204. Alternatively, in some examples, the classifier validator 206 informs the profile generator 208 that the candidate classifiers have been eliminated. The classifier validator 206 provides to the profile generator 208 the candidate classifier that (a) satisfies the threshold number of variables and the threshold accuracy, and (b) has the highest accuracy. In some examples, if candidate classifiers have similar accuracies, the classifier validator 206 provides to the profile generator 208 the candidate classifier that (a) has the lower number of variables and/or (b) has the high number of variables that are observed directly by the vehicle 102.

The profile generator 208 prepares and sends the mode profile 118 to the vehicle 102. The profile generator 208 retrieves the mode profile 118 associated with the driver of the vehicle 102 from the driver profile database 124. The mode profile 118 may include multiple classifiers generated by the classifier generator 204. Each classifier included in the mode profile 118 is associated with a different driving context, such as a geographic area, a navigational route, a time of day, a day of the week, or a destination, etc. The updates the mode profile 118 with the classifier generated by the classifier generator 204. In some examples, when the classifier generator 204 indicates that the candidate classifiers have been eliminated, the profile generator 208 retrieves a classifier stored in the preference database 122 based on the driving context of interest and/or the demographic characteristics of the driver associated with the mode profile 118. For example, when the driver is driving in a new geographical area, the classifier generator 204 and/or the classifier validator 206 may not be able to generate a candidate classifier to add to the mode profile 118. In such an example, the profile generator 208 compares the driving style, usage patterns, vehicle type and vehicle setup (e.g., the powertrain settings, the suspension settings, etc.) to other profiles in the driver profile database 125 and selects classifier from one of the other driver profiles that are generated for the geographic region. In some examples, the profile generator 208 stores the mode profile 118 in the driver profile database 124.

Figure 3:
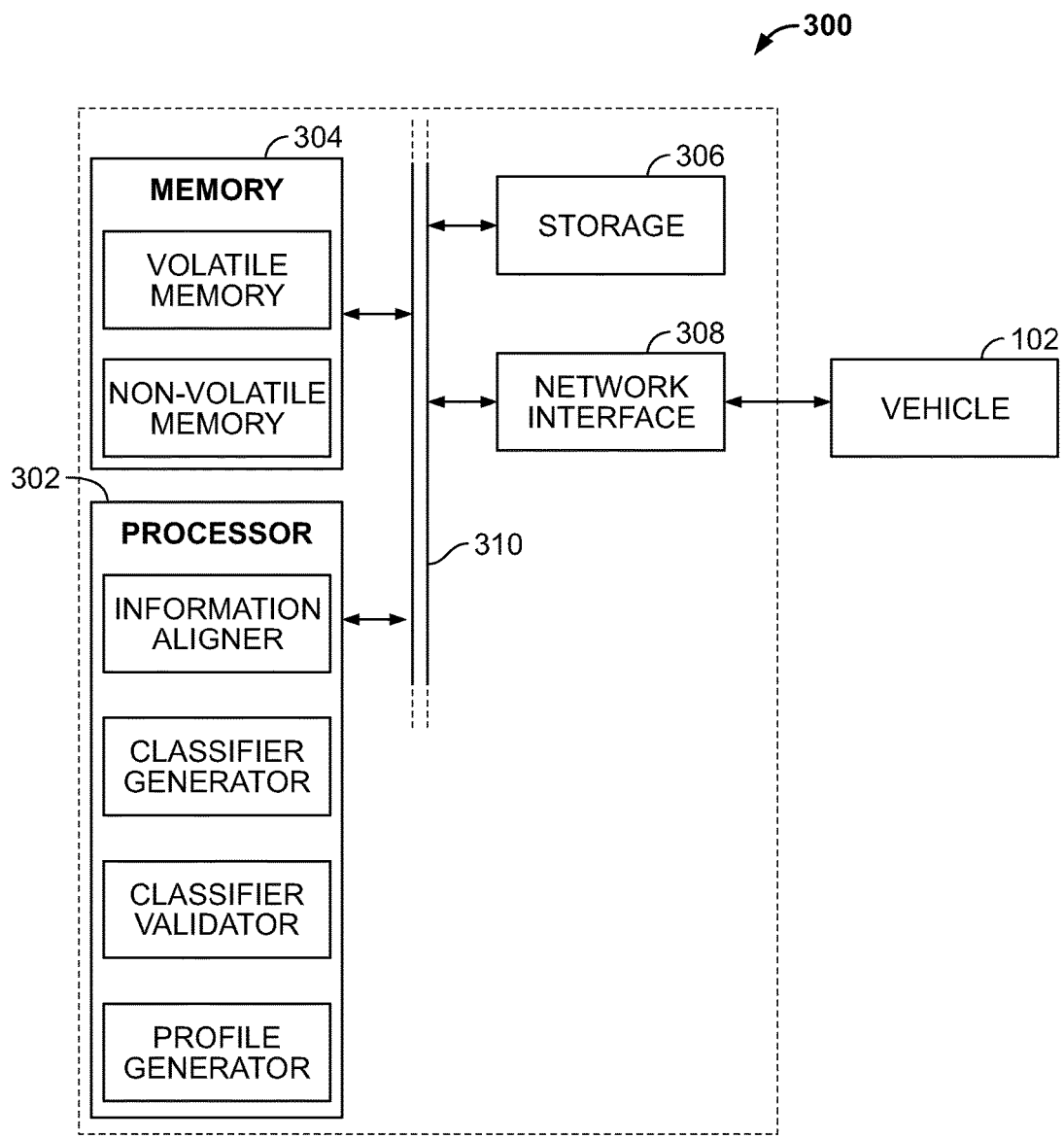
FIG. 3 is a block diagram of a processor platform that may be used to implement the mode mapper of FIGS. 1 and 2.

FIG. 3 illustrates a processor platform 300 that may be used to implement the mode mapper 120 of FIGS. 1 and 2. In the illustrated example, the processor platform 300 includes a processor or controller 302, memory 304, storage 306, a network interface 308, and a data bus 310.

The processor or controller 302 may be any suitable processing device or set of processing devices such as, but not limited to: a microprocessor, a microcontroller-based platform, a suitable integrated circuit, or one or more application-specific integrated circuits (ASICs). In the illustrated example, the processor or controller 302 is structured to include the information aligner 202, the classifier generator 204, the classifier validator 206, and the profile generator 208.

The memory 304 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 304 includes multiple kinds of memory, particularly volatile memory and non-volatile memory. The storage 306 may include any high-capacity storage device, such as a hard drive, and/or a solid state drive. The storage 306 may be local to the processor platform 300 and/or remote from the processor platform 300. In some examples, the preference database 122 and/or the driver profile database 124 are stored in the storage 306.

The memory 304 and the storage 306 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 304, the computer readable medium, and/or within the processor 302 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor, or that cause a system to perform any one or more of the methods or operations disclosed herein. As used herein, the term "computer readable medium" is expressly defined to include any type of computer readable storage device and/or storage disk and to exclude propagating signals.

The network interface 308 facilitates the vehicle 102 interacting with the processor platform 300 is a network connection. The network interface 308 includes a communication device, such as a modem or a network interface card, to facilitate exchange of data with external processor systems (e.g. the on-board computing platform 404 of FIG. 4 below) via a network connection (e.g., an Ethernet connection, a digital subscriber line (DSL), a telephone line, coaxial cable, a cellular telephone system, a Bluetooth connection, etc.). The network interface 308 may utilize a variety of networking protocols now available or later developed including, but not limited to, TCP/IP-based networking protocols.

The data bus 310 communicatively couples the processor 302, the memory 304, the storage 306, and the network interface 308. The data bus 310 may be implemented by one or more interface standards, such as an Ethernet interface, a USB interface, PCI express interface, and/or a Serial ATA interface, etc.

Figure 4:
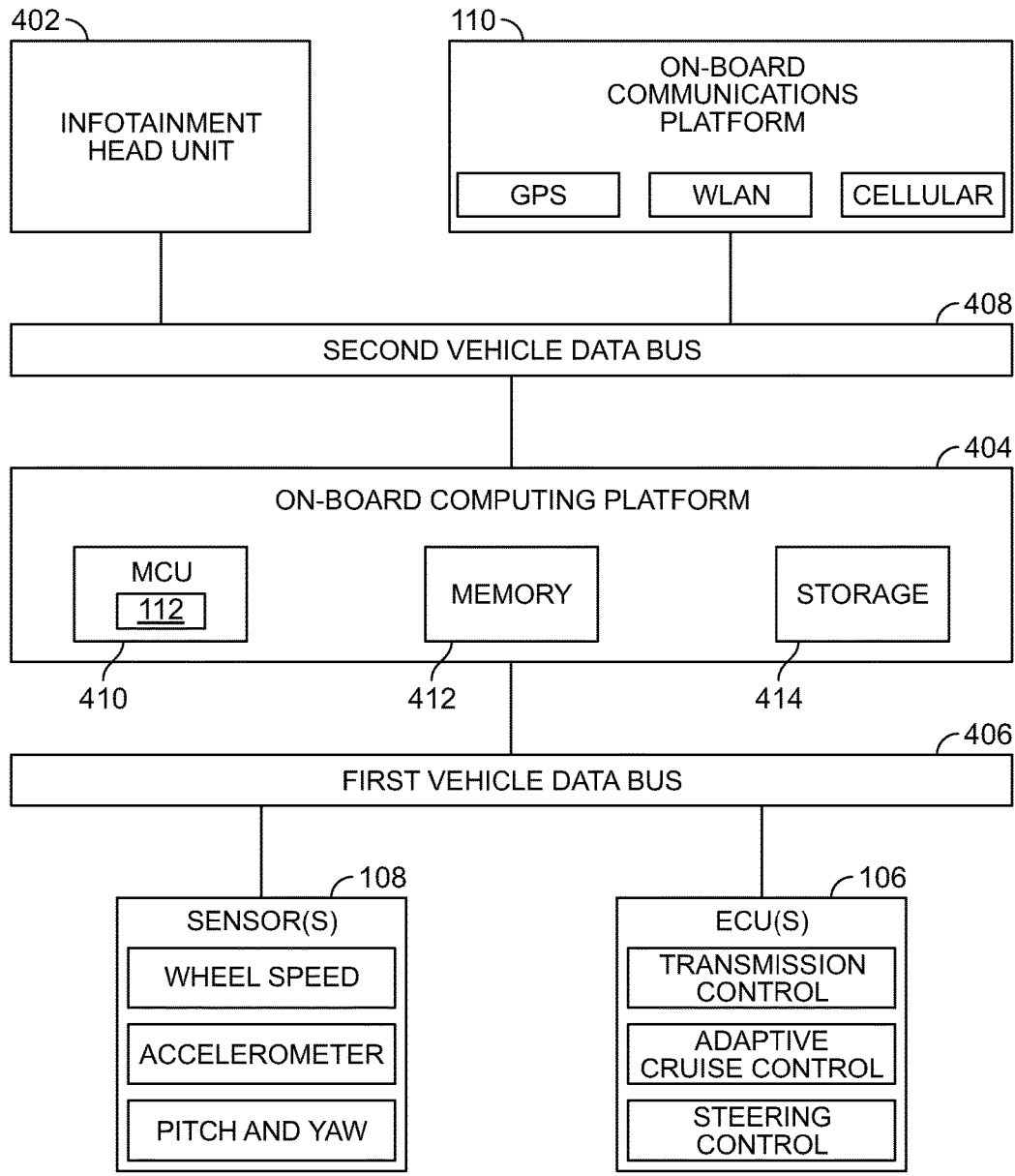
FIG. 4 is a block diagram of electronic components that may be used to implement the mode manager of FIG. 1.

FIG. 4 is a block diagram of electronic components 400 of the vehicle 102 of FIG. 1. The electronic components 400 include the example on-board communications platform 110, the example infotainment head unit 402, an on-board computing platform 404, the example sensors 108, the example ECUs 106, a first vehicle data bus 406, and second vehicle data bus 408.

The on-board communications platform 110 includes wired or wireless network interfaces to enable communication with external networks, such as the external network 114 of FIG. 1. The on-board communications platform 110 also includes hardware (e.g., processors, memory, storage, antenna, etc.) and software to control the wired or wireless network interfaces. In the illustrated example, the on-board communications platform 110 includes a cellular modem, a GPS receiver, and a wireless local area network (WLAN) module. The cellular modem includes controllers for standards-based networks (e.g., Global System for Mobile Communications ("GSM"), Universal Mobile Telecommunications System ("UMTS"), Long Term Evolution ("LTE"), Code Division Multiple Access ("CDMA"), WiMAX ("IEEE 802.16m"); and Wireless Gigabit ("IEEE 802.11ad"), etc. The wireless local area network module includes controllers for wireless networks, such as a Wi-FI® controller (including IEEE 802.11a/b/g/n/ac or others), a Bluetooth® controller (based on the Bluetooth® Core Specification maintained by the Bluetooth Special Interest Group), and/or a ZigBee® controller ("IEEE 802.15.4"), and/or a Near Field Communication ("NFC") controller, etc.

In some examples, the on-board communications platform 110 includes a dedicated short-range communications (DSRC) module. The DSRC module include antenna(s), radio(s) and software to broadcast messages and to establish direct connections between vehicles and infrastructure-based nodes. DSRC is a wireless communication protocol or system, mainly meant for transportation, operating in a 5.9 GHz spectrum band. More information on the DSRC network and how the network may communicate with vehicle hardware and software is available in the U.S. Department of Transportation's Core June 2011 System Requirements Specification (SyRS) report (available at http://www.its.dot-.gov/meetings/pdf/CoreSystem_SE_SyRS_RevA%20 (2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. The on-board communications platform 110 may also include a wired or wireless interface to enable direct communication with an electronic device (e.g., a smart phone, a tablet computer, a laptop, etc.).

The infotainment head unit 402 provides an interface between the vehicle 102 and users (e.g., drivers, passengers, etc.). The infotainment head unit 402 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers. When the mode manager 112 recommends a driving mode based on the mode profile 118, the mode manager 112 presents the recommendation via the infotainment head unit 402.

The on-board computing platform 404 includes a processor or controller 410, memory 412, and storage 414. In the illustrated example, the on-board computing platform 404 is structured to include the mode manager 112. Alternatively, in some examples, the mode manager 112 may be incorporated into an ECU 106 with its own processor and memory. The processor or controller 410 may be any suitable processing device or set of processing devices such as, but not limited to: a microprocessor, a microcontroller-based platform, a suitable integrated circuit, one or more field programmable gate arrays ("FPGAs"), and/or one or more application-specific integrated circuits ("ASICs"). The memory 412 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 412 includes multiple kinds of memory, particularly volatile memory and non-volatile memory. The storage 414 may include any high-capacity storage device, such as a hard drive, and/or a solid state drive.

The memory 412 and the storage 414 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 412, the computer readable medium, and/or within the processor 410 during execution of the instructions.

The ECUs 106 monitor and control the systems of the vehicle 102. The ECUs 106 communicate and exchange information via the first vehicle data bus 406. Additionally, the ECUs 106 may communicate properties (such as, status of the ECU 106, sensor readings, control state, error and diagnostic codes, etc.) to and/or receive requests from other ECUs 106. Some vehicles 102 may have seventy or more ECUs 106 located in various locations around the vehicle 102 communicatively coupled by the first vehicle data bus 406. The ECUs 106 are discrete sets of electronics that include their own circuit(s) (such as integrated circuits, microprocessors, memory, storage, etc.) and firmware, sensors, actuators, and/or mounting hardware. In the illustrated example, the ECUs 106 include the traction control, an adaptive cruise control, and a brake control. The ECUs 106 may also include engine control, transmission control, and/or steering control, etc. When the connected vehicle is autonomous or semi-autonomous, the ECUs 106 may also include an adaptive cruise control.

The first vehicle data bus 406 communicatively couples the sensors 108, the ECUs 106, the on-board computing platform 404, and other devices connected to the first vehicle data bus 406. In some examples, the first vehicle data bus 406 is implemented in accordance with the controller area network ("CAN") bus protocol as defined by International Standards Organization (ISO) 11898-1. Alternatively, in some examples, the first vehicle data bus 406 may be a different bus protocol, such as a Media Oriented Systems Transport ("MOST") bus, or a CAN flexible data ("CAN-FD") bus (defined by ISO 11898-7). The second vehicle data bus 408 communicatively couples the on-board communications platform 110, the infotainment head unit 402, and the on-board computing platform 404. The second vehicle data bus 408 may be a MOST bus, a CAN-FD bus, or an Ethernet bus. In some examples, the on-board computing platform 404 communicatively isolates the first vehicle data bus 406 and the second vehicle data bus 408 (e.g., via firewalls, message brokers, etc.). Alternatively, in some examples, the first vehicle data bus 406 and the second vehicle data bus 408 are the same data bus.

Figure 5:
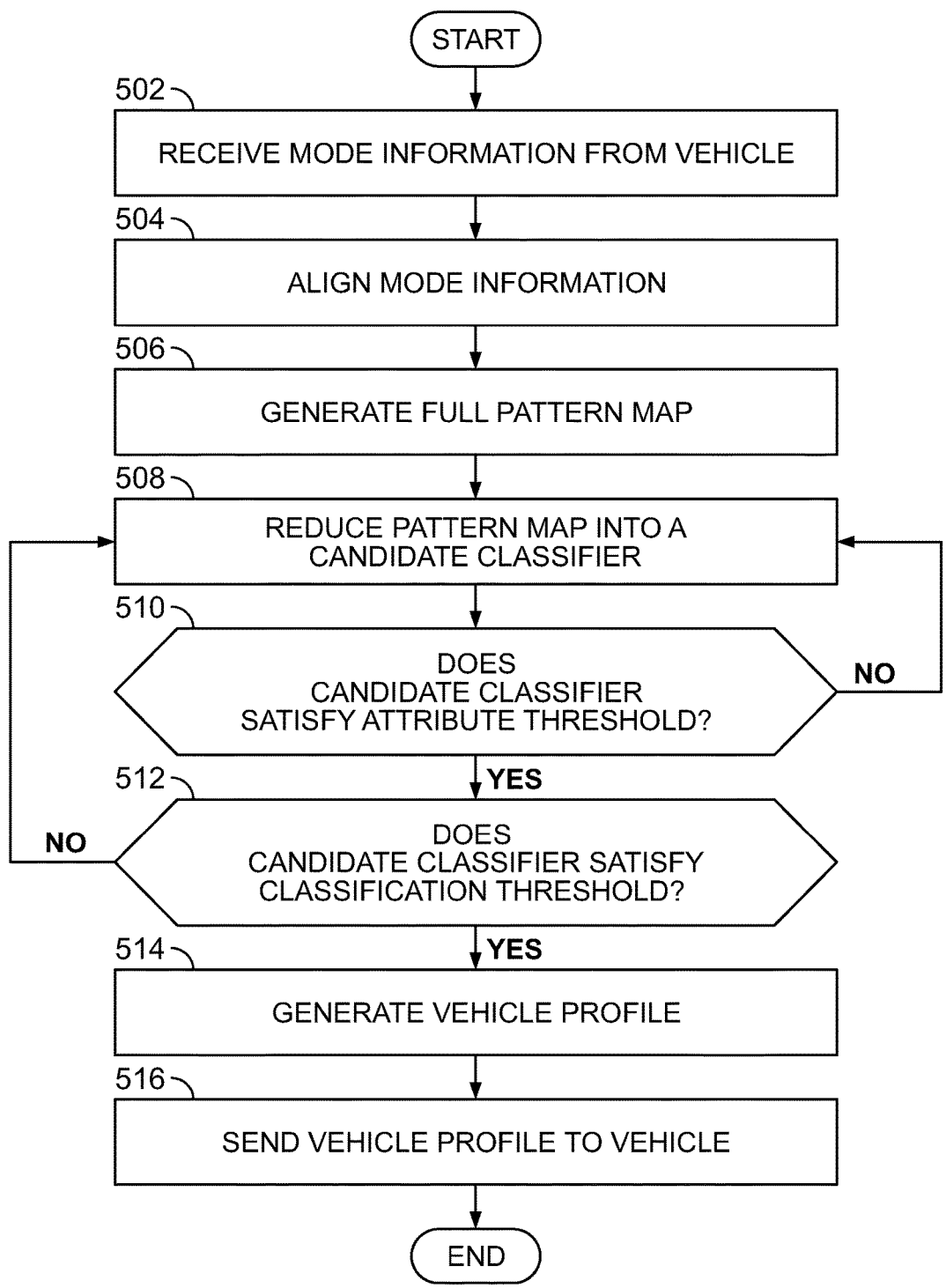
FIG. 5 is a flowchart of an example method to generate a mode profile for a user that may be implemented by the processor platform of FIG. 3.

FIG. 5 is a flowchart of an example method to generate a mode profile 118 for a user (e.g., a driver of the vehicle 102 of FIG. 1) that may be implemented by the processor platform 300 of FIG. 3. Initially, at block 502, the information aligner 202 receives driving mode information (e.g., via the mode event records 116) from the vehicle 102. In some examples, the information aligner 202 receives mode event records 116 in batches from the vehicle 102. At block 504, the information aligner 202 aligns the vehicle dynamics data in the mode event records 116 received at block 502. Aligning the vehicle dynamics data facilitates comparing and analyzing the vehicle dynamics data to determine the relationships between the vehicle dynamics data and the driver's driving mode preferences.

At block 506, the classifier generator 204 generates a full pattern map based on the aligned vehicle dynamics data. The full pattern map associates (e.g., as inputs) the aligned vehicle dynamics data with the driving mode changes (e.g., as an output) and includes independent and dependent variables within the aligned vehicle dynamics data. That is, the full pattern map is descriptive of the driver's driving mode preferences and includes variables within the aligned vehicle dynamics data regardless of whether a particular variable contributes to the driver's preferences. At block 508, the classifier generator 204 reduces the full pattern map into a candidate classifier. The candidate classifier associates a subset of the full pattern map with prediction of a driving mode change. The classifier generator 204 applies design of experiment techniques (such as, full factorial design, fractional factorial design, etc.) and machine learning techniques (such as, support vector machines, fuzzy C-means, K nearest neighbor, linear discriminant analysis, mountain clustering) to identify candidate classifiers that include different combinations of the vehicle dynamics data.

At block 510, the classifier validator 206 determines whether the candidate classifier generated at block 508 satisfies the attribute threshold (e.g., the threshold number of variables). The candidate classifier satisfies attribute threshold when the number of input variables of the candidate classifier is less than or equal to the attribute threshold. In some examples, the attribute threshold is five. The attribute threshold is selected to balance the candidate classifiers predictive ability with the processing load to generate the prediction. If the candidate classifier does not satisfy the attribute threshold, the classifier generator 204 generates another candidate classifier (at block 508). Otherwise, if the candidate classifier satisfies the attribute threshold, at block 512, the classifier validator 206 determines whether the candidate classifier satisfies a classification threshold (e.g., the threshold accuracy). The candidate classifier satisfies the classification threshold when the percentage of correct classifications is greater than or equal to the classification threshold. In some examples, the classification threshold is seventy percent. To calculate the percentage of correct classifications, the classifier validator 206 applies the vehicle dynamics data from the mode event records 116 to the candidate classifier and compares the output of the candidate classifier with the driving mode change in the mode event records 116. If the candidate classifier does not satisfy the classification threshold, the classifier generator 204 generates another candidate classifier (at block 508).

Otherwise, if the candidate classifier satisfies the classification threshold, at block 514, the profile generator 208 generates a vehicle profile 118. The vehicle profile 118 may includes candidate classifiers associated with different driving contexts that are used by the vehicle 102 depending on the current driving context of the vehicle 102. At block 516, the profile generator 208 sends the vehicle profile 118 to the vehicle 102.

Figure 6:
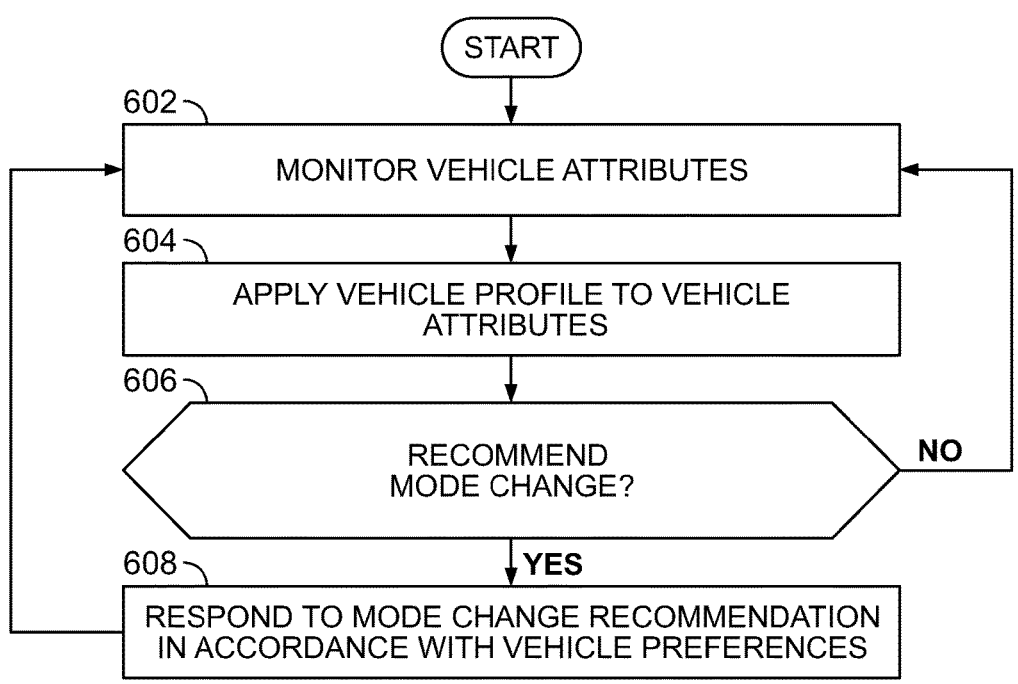
FIG. 6 is a flowchart of an example method to predict vehicle driving modes based on the mode profile that may be implemented by the electronic components of FIG. 4.

FIG. 6 is a flowchart of an example method to predict vehicle driving modes based on the mode profile 118 that may be implemented by the electronic components 400 of FIG. 4. Initially, at block 602, the mode manager 112 monitors the vehicle attributes (e.g. the vehicle dynamics data). In some examples, the mode manager 112 monitors the vehicle attributes via the first vehicle data bus 406. At block 604, the mode manager 112 applies the vehicle attributes to one of the classifiers in the vehicle profile 118. In some examples, the mode manager 112 one of the classifiers in the vehicle profile 118 based on the current driving context of the vehicle 102. At block 606, the mode manager 112 determines whether the classifier predicts a driving mode change based on the vehicle attributes. If the classifier does not predict a driving mode change, the mode manager 112 continues to monitor the vehicle attributes (at block 602). Otherwise, at block 608, if the classifier predicts a driving mode change, the mode manager 112 responds to the driving mode prediction in accordance with the vehicle preferences. In some examples, when the vehicle is non-autonomous, the mode manager 112 displays, via the infotainment head unit 402, the prediction as a recommendation to the driver of the vehicle 102. In some examples, when the vehicle 102 is autonomous or semi-autonomous, the mode manager 112, via one or more ECUs 106, changes the driving mode of the vehicle 102 automatically (e.g., without driver intervention). The mode manager 112 then continues to monitor the vehicle attributes (at block 602).

The flowchart of FIG. 5 is a method that may be implemented by machine readable instructions that comprise one or more programs that, when executed by a processor (such as the processor 302 of FIG. 3), cause the vehicle support entity 104 to implement the mode mapper 120 of FIGS. 1 and 2. The flowchart of FIG. 6 is a method that may be implemented by machine readable instructions that comprise one or more programs that, when executed by a processor (such as the processor 410 of FIG. 4), cause the vehicle 102 to implement the mode manager 112 of FIG. 1. Further, although the example program(s) is/are described with reference to the flowcharts illustrated in FIGS. 5 and 6, many other methods of implementing the example mode mapper 120, and/or the mode manager 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
sensors to monitor vehicle data;
memory to store a plurality of classifiers received from a server, the classifiers to predict a preference to transition from a first mode to a second mode based on a subset of the vehicle data; and
a processor communicatively coupled to the memory and the sensors, the processor to:
select one of the plurality of classifiers based on a driving context;
apply the vehicle data to the selected one of the plurality of classifiers to generate a recommendation on whether to switch to the second mode while traversing a route; and
in response to generating the recommendation to switch to the second mode, display the recommendation on an infotainment head unit.

2. A method comprising:
monitoring, by a first processor, vehicle data when a vehicle changes from a first mode to a second mode;
analyzing, by a second processor, the vehicle data to identify a preference for the second mode during a driving context;
generating a recommendation on whether to switch to the second mode while traversing a route based on the vehicle data, and the driving context; and
presenting the recommendation to a driver.

3. The method of claim 2, including, in response to generating the recommendation to switch to the second driving mode, automatically switching the vehicle into the second mode.

4. The method of claim 2, wherein the driving context is at least one of a geographical area, a time of day, or a day of the week.

5. The method of claim 2, wherein to analyze the vehicle data to identify the preference for the second mode during the driving context, the method further includes generating a candidate classifier by applying design of experiment techniques and machine learning techniques to the vehicle data, the classifier to predict the preference to transition from the first mode to the second mode based on a subset of the vehicle data.

6. The method of claim 5, including rejecting the candidate classifier if the candidate classifier does not satisfy an attribute threshold.

7. The method of claim 5, including rejecting the candidate classifier if the candidate classifier does not satisfy a classification threshold.

8. The method of claim 2, wherein generating the recommendation on whether to switch to the second mode while traversing the route based on the vehicle data, and the driving context includes:
selecting a classifier from a plurality of classifiers based on the driving context; and
applying the vehicle data to the selected classifier.

9. A system comprising:
a server configured to analyze vehicle data to identify a preference of a driver to switch from a first mode to a second mode during a driving context;
a vehicle configured to:
monitor vehicle data when the vehicle changes from the first mode to the second mode;
generate a recommendation on whether to switch to the second mode while traversing a route based on a classifier received from the server; and
present the recommendation to the driver.

10. The system of claim 9, including, in response to generating the recommendation to switch to the second driving mode, the vehicle is configured to automatically switch into the second mode.

11. The system of claim 9, wherein the driving context is at least one of a geographical area, a time of day, or a day of a week.

12. The system of claim 9, wherein to analyze the vehicle data to identify the preference for the second mode during the driving context, the server is configured to generate a candidate classifier by applying design of experiment techniques and machine learning techniques to the vehicle data, the classifier to predict the preference to transition from the first mode to the second mode based on a subset of the vehicle data.

13. The system of claim 12, wherein the server is configured to reject the candidate classifier if the candidate classifier does not satisfy an attribute threshold.

14. The system of claim 12, wherein the server is configured to reject the candidate classifier if the candidate classifier does not satisfy a classification threshold.

15. The system of claim 9, wherein to generate the recommendation on whether to switch to the second mode while traversing the route based on the vehicle data, and the driving context, the vehicle is configured to:
- select a classifier from a plurality of classifiers received from the server based on the driving context; and
- apply the vehicle data to the selected classifier.

16. A method comprising:
- by a server:
  - generating, based on historic vehicle data, a classifier modeling a preference to switch from a first mode to a second mode while the vehicle experiences a set of road conditions;
- by a vehicle:
  - receiving the classifier;
  - generating a recommendation by applying current vehicle data to the classifier; and
  - adjusting settings of electronic control units to switch to the second mode while traversing a route based the recommendation.

* * * * *